United States Patent [19]

Mueller

[11] Patent Number: 5,286,130
[45] Date of Patent: Feb. 15, 1994

[54] CLEVIS ASSEMBLY

[76] Inventor: Charles R. Mueller, 1253 Blairmoor Ct., Grosse Pointe Woods, Mich. 48236

[21] Appl. No.: 994,977

[22] Filed: Dec. 22, 1992

[51] Int. Cl.⁵ .......................... B66C 1/24; B66C 1/34
[52] U.S. Cl. .................................... 403/79; 403/60; 403/165; 403/362; 294/1.1
[58] Field of Search ................ 294/1.1; 403/78, 362, 403/79, 60, 165, 164, 155, 150

[56] References Cited

U.S. PATENT DOCUMENTS

| | | | |
|---|---|---|---|
| 256,078 | 4/1882 | Titus | 403/362 X |
| 931,270 | 8/1909 | Clarkson . | |
| 1,516,891 | 11/1924 | Pridgen . | |
| 1,642,958 | 9/1927 | Joyner . | |
| 1,867,574 | 7/1932 | Leman . | |
| 2,097,465 | 11/1937 | Morrison | 56/86 |
| 2,246,588 | 6/1941 | Harrall | 308/231 |
| 2,507,349 | 5/1950 | Bland | 255/25 |
| 2,519,460 | 8/1950 | Hansen | 287/91 |
| 2,651,533 | 9/1953 | Miller | 287/91 |
| 2,672,230 | 3/1954 | Jetzke | 198/177 |
| 2,812,971 | 11/1957 | Teutsch | 294/73 |
| 3,270,494 | 9/1966 | Holmes | 59/86 |
| 3,297,293 | 1/1967 | Andrews et al. | 248/361 |
| 3,362,671 | 1/1968 | Johnson | 248/324 |
| 3,492,033 | 1/1970 | Mueller | 287/91 |
| 3,534,650 | 10/1970 | Kubokawa | 85/3 |
| 3,628,820 | 12/1971 | Blatt | 294/82 R |
| 3,905,633 | 9/1975 | Larson | 294/82 R |
| 4,431,352 | 2/1984 | Andrews | 410/101 |
| 4,436,468 | 3/1984 | Ozaki et al. | 403/362 X |
| 4,570,987 | 2/1986 | Wong et al. | 294/1.1 |
| 4,641,986 | 2/1987 | Tsu et al. | 403/164 |
| 4,692,054 | 9/1987 | Kirby | 403/362 X |
| 4,699,410 | 10/1987 | Seidel | 294/1.1 |
| 4,705,422 | 11/1987 | Tsui et al. | 403/60 |
| 5,054,982 | 10/1991 | Freeman | 411/400 |

Primary Examiner—Eric K. Nicholson
Assistant Examiner—Christopher J. Novosad
Attorney, Agent, or Firm—Krass & Young

[57] ABSTRACT

A clevis assembly including a clevis body, a clevis loop pivotally mounted on the clevis body, a collar, a fastener, and a set screw assembly. The collar is externally threaded and threads into a counterbore opening in the lower end of the clevis body. The fastener has a circular head portion which is journalled in a bore in the clevis body with the shank portion of the fastener passing downwardly through the collar. A set screw assembly is positioned in a transverse bore in the clevis body extending between the outer periphery of the clevis body and the bore in which the head of the fastener is journalled so that tightening of the set screw assembly engages the head of the fastener to lock the fastener relative to the clevis body and loosening of the set screw assembly allows relative rotational movement between the fastener and the clevis body.

13 Claims, 2 Drawing Sheets

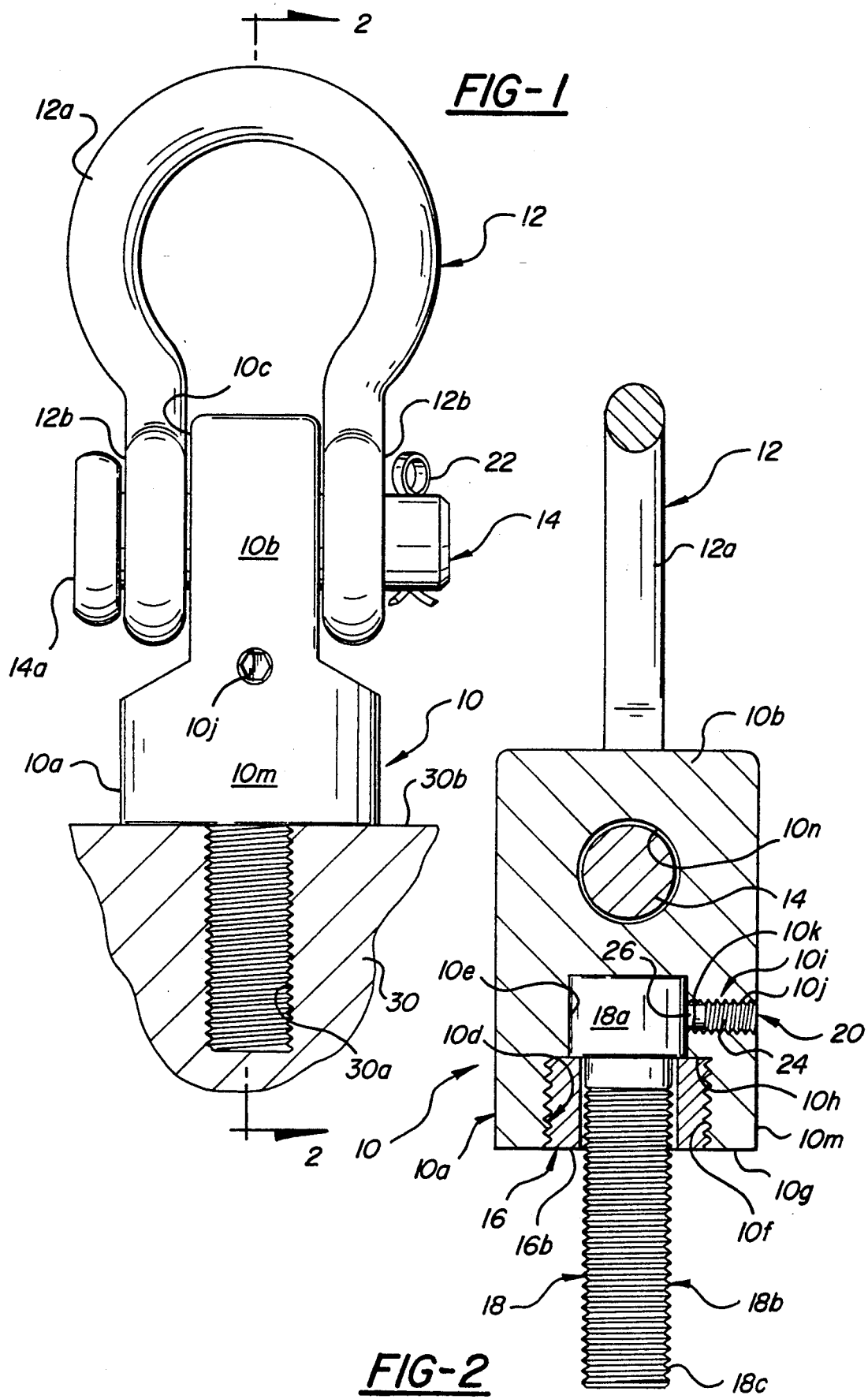

CLEVIS ASSEMBLY

BACKGROUND OF THE INVENTION

This invention relates to a clevis assembly adapted for connection to a workpiece so that the workpiece may be lifted by a lifting device such as a hoist.

Clevis assemblies are in common usage to lift and move heavy articles and typically include a clevis loop for engagement by the lifting device, a clevis body, and a fastener mounted in the clevis body and presenting a threaded portion for engagement in a blind threaded bore in the article to be lifted. A multitude of clevis assemblies have been proposed and utilized over a period of many years. Although the prior art clevis assemblies have been generally satisfactory, they suffer from one or more disadvantages. Specifically, they are extremely complicated and therefore expensive to produce and maintain and/or they are very difficult and clumsy to install and remove and/or they are subject to early fatigue failure because of their inability to readily align themselves with the plane of the lifting force.

SUMMARY OF THE INVENTION

This invention is directed to the provision of an improved clevis assembly.

More specifically, this invention is directed to the provision of a clevis assembly which is simple in construction, easy to install and remove, and able to readily adjust itself to the plane of the lifting force.

The invention clevis assembly is of the type comprising a clevis, including a clevis loop and a clevis body, and a fastener mounted in the clevis body. According to an important feature of the invention, a downwardly opening recess is defined within the clevis body, the fastener includes an upper end received in the recess and a threaded lower end projecting downwardly below the clevis body, and the assembly further includes a set screw threadably positioned in the clevis body and operative when turned to selectively allow and preclude rotation of the fastener relative to the clevis. This arrangement allows the fastener to be secured relative to the clevis by a simple turning of the set screw to facilitate installation of the clevis assembly into a blind threaded bore in the article to be lifted and thereafter allows the fastener to be unlocked relative to the clevis by a counter turning of the set screw so as to allow the clevis to readily seek the plane of the lifting force.

According to a further feature of the invention, the fastener includes a head portion positioned in the recess and the set screw engages the fastener head portion. This arrangement provides a convenient means of locking and unlocking the fastener.

According to a further feature of the invention, the fastener head portion is circular; the fastener includes a shank portion defining the threaded lower end; the recess includes an upper smooth circular portion rotatably receiving the fastener head portion and a lower threaded counterbore portion; and the clevis assembly further includes an externally threaded annular collar threaded into the threaded counterbore and passing the shank portion of the fastener. This arrangement provides a convenient means of defining the upper smooth circular recess portion for receipt of the fastener head portion and a lower portion for passing the shank portion of the fastener.

In the disclosed embodiment of the invention, the set screw is received in a transverse bore in the clevis body opening at its outer end at the outer periphery of the body and opening at its inner end in the upper portion of the recess and the assembly further includes a plug positioned in the transverse bore between the set screw and the fastener head portion so as to fixedly engage the fastener head portion in response to rotation of the set screw.

DESCRIPTION OF THE DRAWING

FIG. 1 is an assembled view of the invention clevis assembly shown in association with an article to be lifted;

FIG. 2 is a cross-sectional view of the invention clevis assembly; and

DETAILED DESCRIPTION OF THE PREFERRED EMBODIMENT

Figure 3:
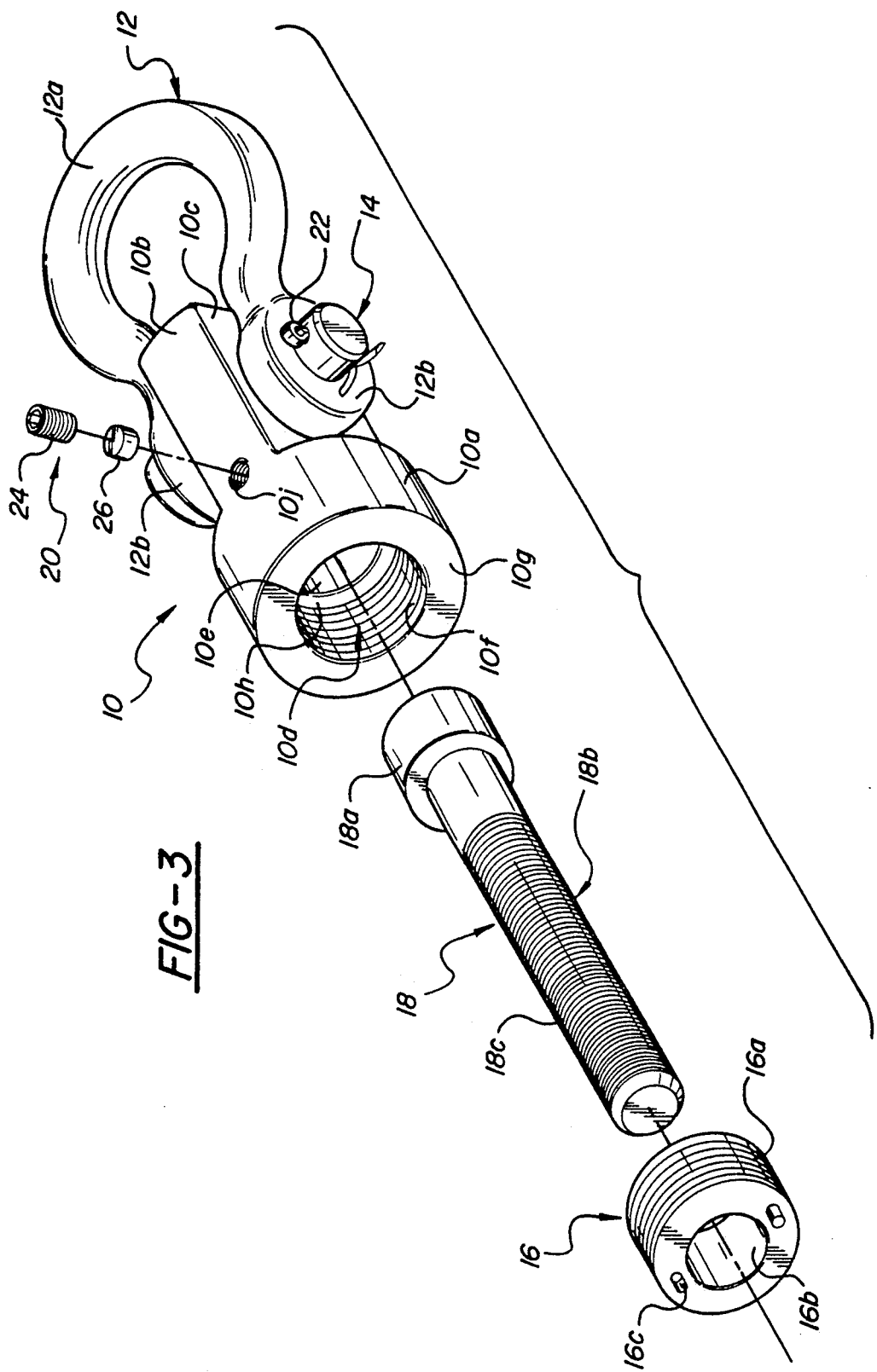
FIG. 3 is an exploded view of the invention clevis assembly.

The invention clevis assembly, broadly considered, includes a clevis body 10, a clevis loop 12, a pivot pin 14, a collar 16, a fastener 18, and a set screw assembly 20. All of the elements unless otherwise indicated are formed of a suitable ferrous material.

Clevis body 10 includes a circular lower main body portion 10a and an upstanding mounting portion 10b defining flat opposed sides 10c. A recess 10d is defined in main body portion 10a and opens in the lower main body portion. Recess 10d includes an upper smooth circular bore portion 10e and a lower circular threaded counterbore portion 10f opening in the lower face of the clevis body to define an annular seat 10g at the lower face of the clevis body. The upper bore portion 10e and lower counterbore 10f coact to define an annular shoulder 10h therebetween. Clevis body 10a further defines a transverse bore 10i including a threaded outer portion 10j and a smooth inner portion 10k. Bore 10i opens at its inner end in bore 10e and opens at its outer end in the outer peripheral surface 10m of the clevis.

Clevis loop 12 is in the form of a U-shaped shackle including an eye or bight portion 12a adapted for coaction with a lifting device and hub portions 12b positioned proximate respective flat sides 10c and pivotally mounting the clevis loop on a pivot pin 14 which in turn is journalled in a transverse bore 10n in the upper mounting portion 10b of the clevis body. Pin 14 includes a head portion 14a at one end and a cotter pin 22 at the other end coacting with the head portion 14a to maintain the pin, clevis loop, and clevis body in their assembled pivotal relationship.

Collar 16 has a circular annular configuration and is externally threaded at 16a. Collar 16 is sized to be threadably received in threaded counterbore 10f and has a length or height somewhat less than the depth of counterbore 10d so that, when the collar is threaded into the counterbore 10f and seated against annular shoulder 10h, the annular lower face 16b of the collar is recessed upwardly with respect to the annular seat 10g of the clevis body. Spanner holes 16c are provided to facilitate the insertion and removal of the collar.

Fastener 18 includes a round cylindrical head portion 18a and a shank portion 18b defining a threaded lower end 18c. Head portion 18a has a length or height slightly less than the height of recess 10e and is sized to be journalled in recess 10e. Shank portion 18b has a diameter slightly less than the diameter of the inner periphery 16d of collar 16 so that the shank portion may pass loosely through the collar to position the threaded lower end 18c of the fastener below the clevis.

Set screw assembly 20 includes a set screw 24 and a brass plug 26. Brass plug 26 is sized to be positioned slidably in the smooth bore 10k of transverse bore 10i and set screw 24 is sized to be threaded into the threaded portion 10j of transverse bore 10i so that turning of the set screw moves the inner end of brass plug 10k into and out of locking coaction with the head portion 18a of the fastener.

In the use of the invention clevis assembly, set screw 20 is tightened to fixedly secure the head portion 18a of the fastener within recess 10e whereafter the clevis assembly may be secured to an article 30 to be lifted by turning the assembly as a unit, including the fastener 18, to screw the fastener downwardly into a threaded blind bore 30a in the article to be lifted until the annular seat 10g on the lower face of the clevis body seats against the upper face 30b of the article, whereafter the set screw assembly 20 may be loosened to allow the fastener head 18a to turn in the recess 10e and thereby allow the clevis to readily turn relative to the fastener to assume a position in alignment with the force being applied by the lifting device inserted into the clevis loop.

The swivelling of the clevis relative to the fastener will be resisted somewhat by the frictional interface defined between the clevis annular seat 10g and the confronting surface 30a of the article 30 but this frictional resistance can be selectively controlled by the extent to which the clevis is tightened downwardly onto the article and, in any event, the small annular area defined by the seat 10g in combination with the large moment arm, as measured from the central axis of the fastener, ensures that the clevis will readily turn once the set screw assembly has been loosened. Note in this regard that the recessed mounting of the lower face 16b of the collar 16 relative to the annular seat 10g minimizes the amount of lower surface area of the clevis in contact with the article 30 and thereby minimizes the resistance to turning movement of the clevis on the axis of the fastener after the set screw assembly has been loosened.

Alternatively, the set screw may be left in a tightened condition after the clevis has been secured to the article, in which event the resistance to turning movement of the clevis will consist of a combination of frictional forces at the interface of the seat 10g and the article 30 and at the interface of the brass plug 10k and the fastener head portion 18a.

The clevis assembly may be readily removed from the article after the article has been lifted by again tightening the set screw assembly, if the set screw assembly has been loosened, so as to lock the fastener relative to the clevis whereafter the entire clevis assembly may be turned in a loosening direction to unscrew the fastener threaded portion from the blind bore 30a and allow removal of the clevis assembly from the article.

The invention clevis assembly will be seen to provide a clevis construction that is simple and inexpensive, that allows for ready attachment of the clevis to an article to be lifted and ready removal of the clevis from the article following the lifting, and that allows the clevis to readily align itself with the plane of the lifting force so as to minimize stresses within the clevis and prolong clevis life.

Whereas a preferred embodiment of the invention has been illustrated and described in detail, it will be apparent that various changes may be made in the disclosed embodiment without departing from the scope or spirit of the invention.

I claim:

1. A clevis assembly comprising:
    a clevis including a clevis loop and a clevis body defining a downwardly opening recess;
    a fastener having an upper end received in said recess and a threaded lower end projecting downwardly below said body; and
    a set screw positioned in said body and operative when turned to selectively allow and preclude rotation of said fastener relative to said clevis.

2. A clevis assembly according to claim 1 wherein said fastener includes a head portion positioned in said recess and said set screw engages said fastener head portion.

3. A clevis assembly according to claim 2 wherein said fastener head portion is circular; said fastener includes a shank portion defining said threaded lower end; said recess includes an upper smooth circular portion rotatably receiving said fastener head portion and a lower threaded counterbore portion; and said clevis assembly further includes an externally threaded annular collar threaded into said threaded counterbore and passing the shank portion of the fastener.

4. A clevis assembly according to claim 1 wherein said clevis loop comprises a separate loop member pivotally mounted on said clevis body.

5. A clevis assembly comprising:
    a clevis including a clevis loop and a clevis body defining a downwardly opening recess including an upper smooth circular bore and a lower threaded circular counterbore coacting with said upper bore to define an annular shoulder therebetween;
    an annular collar having a threaded outer periphery sized to be threadably received in the counterbore and seated at its upper end on said shoulder; and
    a fastener having a head portion received in the upper bore and a shank portion passing downwardly through the collar.

6. A clevis assembly according to claim 5 wherein said assembly further includes a set screw threadably received in said clevis body and operative in response to turning of the set screw to fixedly secure the fastener head portion against rotation in said upper bore.

7. A clevis assembly according to claim 6 wherein the set screw is received in a transverse bore in the clevis body opening at its outer end at the outer periphery of the body and opening at its inner end in said upper bore, and the assembly further includes a plug positioned in the transverse bore between the set screw and the fastener head portion so as to fixedly engage the fastener head portion in response to rotation of the set screw.

8. A clevis assembly according to claim 5 wherein said clevis loop comprises a separate loop member pivotally mounted on said clevis body.

9. A clevis assembly according to claim 8 wherein said separate loop member comprises a U-shaped shackle.

10. A clevis assembly including:
    a clevis including a clevis loop and a clevis body defining a downwardly opening recess including an upper smooth circular bore and a lower threaded circular bore;
    an annular externally threaded collar threadably received in said threaded bore;

a fastener having a circular head portion rotationally mounted in said upper bore and a shank portion passing downwardly through the collar and defining a threaded lower end; and means operative to selectively preclude rotation of said fastener relative to said clevis.

11. A clevis assembly according to claim 10 wherein said operative means includes a set screw threadably received in said clevis body and operative when turned to fixedly secure the fastener head portion to the clevis.

12. A clevis assembly comprising a clevis including a clevis loop and a clevis body defining a downwardly opening recess, and a fastener having an upper end journalled in said recess and a threaded lower end projecting downwardly below said body, characterized in that the assembly further includes a set screw positioned in a threaded transverse bore in said body and operative when turned to lock said fastener against rotation relative to said clevis.

13. A clevis assembly according to claim 12 wherein said recess is circular, said fastener includes a circular head portion journalled in said recess, said transverse bore opens in said recess, and said set screw is operative to lock said head portion against rotation in said recess.

* * * * *